(12) United States Patent  (10) Patent No.: US 6,715,061 B1
Wang  (45) Date of Patent: Mar. 30, 2004

(54) MULTIMEDIA-INSTRUCTION ACCELERATION DEVICE FOR INCREASING EFFICIENCY AND METHOD FOR THE SAME

(75) Inventor: Ko-Fang Wang, Hsinchu (TW)

(73) Assignee: Via Technologies, Inc., Taipei (TW)

( * ) Notice: Subject to any disclaimer, the term of this patent is extended or adjusted under 35 U.S.C. 154(b) by 694 days.

(21) Appl. No.: 09/614,542

(22) Filed: Jul. 12, 2000

(51) Int. Cl.⁷ .......................... G06F 9/302; G06F 15/82; G06F 9/46; H04M 11/00
(52) U.S. Cl. .......................... 712/222; 712/22; 712/25; 712/210; 712/225; 712/227; 707/104.1; 709/231; 709/322; 709/323; 379/88.13; 379/88.14
(58) Field of Search .................. 712/222, 221, 712/210, 20, 21, 22, 213, 25; 710/35, 37; 707/104.1; 709/231, 322, 324; 382/233; 379/88.13, 88.14

(56) References Cited

U.S. PATENT DOCUMENTS

| | | | | |
|---|---|---|---|---|
| 5,768,429 A | * | 6/1998 | Jabbi et al. | 382/233 |
| 5,809,292 A | * | 9/1998 | Wilkinson et al. | 712/222 |
| 6,105,129 A | * | 8/2000 | Meier et al. | 712/222 |
| 6,405,267 B1 | * | 6/2002 | Zhao et al. | 710/35 |
| 6,449,653 B2 | * | 9/2002 | Klemets et al. | 709/231 |

* cited by examiner

*Primary Examiner*—Daniel H. Pan
(74) *Attorney, Agent, or Firm*—Rosenberg, Klein & Lee

(57) ABSTRACT

The present invention proposes a multimedia-instruction acceleration device for increasing efficiency and a method for the same, which uses instruction strings having a floating-point value check field to execute commands of single-instruction/multi-data format, and further transforms the floating-point value to a fixed one. The present invention can effectively save executing time and simplify numerical calculation process, and can fully exploit memory space to achieve the object of increasing acceleration operation and execution of multimedia instructions.

20 Claims, 4 Drawing Sheets

| 31 | 30 | 29 | 28 | 27 | 26 | 25 | 24~0 |
|---|---|---|---|---|---|---|---|
| 1 | 1 | 1 | 0 | ID field | | | auxiliary data |

| 31 | 30 | 29 | 28 | 27 | 26 | 25 | 24~9 | 8~0 |
|---|---|---|---|---|---|---|---|---|
| 1 | 1 | 1 | 1 | 0 | 0 | 0 | reserved | I/O address |

| 31 | 30 | 29 | 28 | 27 | 26 | 25 | 24~21 | 20~12 | 11~9 | 8~0 |
|---|---|---|---|---|---|---|---|---|---|---|
| 1 | 1 | 1 | 1 | 0 | 0 | 1 | reserved | I/O address 1 | reserved | I/O address 2 |

| 31 | 30 | 29 | 28 | 27 | 26 | 25 | 24~12 | 11~9 | 8~0 |
|---|---|---|---|---|---|---|---|---|---|
| 1 | 1 | 1 | 1 | 0 | 1 | 0 | counter value | reserved | I/O address |

| 31 | 30 | 29 | 28 | 27 | 26 | 25 | 24~9 | 8~0 |
|---|---|---|---|---|---|---|---|---|
| 1 | 1 | 1 | 1 | 0 | 1 | 1 | counter value | ID field |

MULTIMEDIA-INSTRUCTION ACCELERATION DEVICE FOR INCREASING EFFICIENCY AND METHOD FOR THE SAME

FIELD OF THE INVENTION

The present invention relates to a multimedia-instruction acceleration device for increasing efficiency and a method for the same, which uses instruction strings having a floating-point value check field to execute commands of single-instruction/multi-data format, and further transforms the floating-point value to a fixed one. The present invention can effectively save executing time and simplify numerical calculation process, and can fully exploit memory space to achieve the object of increasing acceleration operation and execution of multimedia instructions.

BACKGROUND OF THE INVENTION

Along with the continual progress of computer technology, the peripheral products thereof evolve. High-end peripheral devices have been successively developed. With a multimedia acceleration card including three-dimensional (3D) technology now hot in computer industry as an example, it provides expanded specific memories to enhance the graphic calculation of a central processing unit (CPU). The graphic display resolution of a general computer can be effectively improved, especially for the processing of 3D graphics. However, for devices having a multimedia acceleration card in prior art, every multimedia data needs to be written in a specific input/output (I/O) port address. Therefore, the instruction is generally of single-instruction/single-data format. That is, one data must be matched to one instruction. Therefore, if a plurality of data need to be processed, a plurality of instructions are required. Redundancy of instructions and data will easily arise and memory space will be wasted. Moreover, execution time will be increased, and display error of graphics variation may even arise indirectly.

Besides, because long instructions and execution time of 3D display will influence the quality of voices played, discontinuity may occur in voices. Therefore, a 3D display program and a voice-playing program generally can not be executed simultaneously.

SUMMARY AND OBJECTS OF THE PRESENT INVENTION

One object of the present invention is to provide a multimedia-instruction acceleration device for increasing efficiency and a method for the same, which uses instruction strings having a floating-point value check field to execute commands of single-instruction/multi-data format, and further transforms the floating-point value to a fixed one. The present invention can effectively save executing time and simplify numerical calculation process, and can fully exploit memory space to achieve the object of increasing acceleration operation and execution of multimedia instructions.

Another object of the present invention is to provide a multimedia-instruction acceleration device for increasing efficiency and a method for the same, which uses instruction strings having a floating-point value check field to execute commands of single-instruction/multi-data format, and further inserts a voice-mode instruction among the mutli-data pertaining to the single instruction. The present invention can thus execute a voice-playing program during the process of 3D acceleration operation to enhance the performance of the multimedia program.

The various objects and advantages of the present invention will be more readily understood from the following detailed description when read in conjunction with the appended drawings, in which:

BRIEF DESCRIPTION OF DRAWING

FIG. 4A is a diagram showing the format of mode-0 control instructions according to a preferred embodiment of the present invention;

FIG. 4B is a diagram showing the format of mode-1 control instructions according to a preferred embodiment of the present invention;

FIG. 4C is a diagram showing the format of mode-2 control instructions according to a preferred embodiment of the present invention;

FIG. 4D is a diagram showing the format of mode-3 control instructions according to a preferred embodiment of the present invention;

FIG. 4E is a diagram showing the format of mode-4 control instructions according to a preferred embodiment of the present invention.

DETAILED DESCRIPTION OF PREFERRED EMBODIMENT

Figure 1:
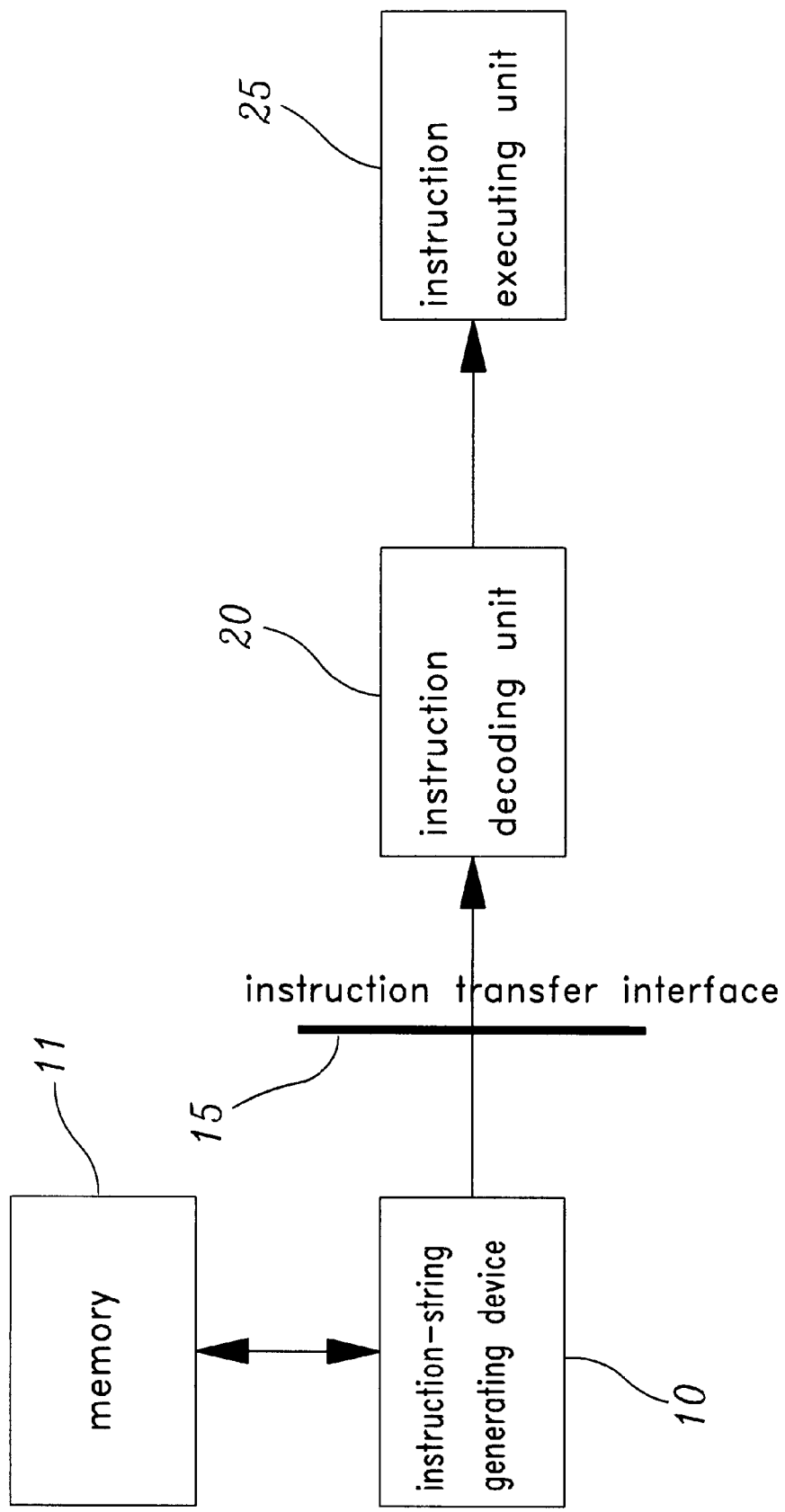
FIGS. 1 and 2 are block diagrams according to a preferred embodiment of the present invention.
Figure 2:
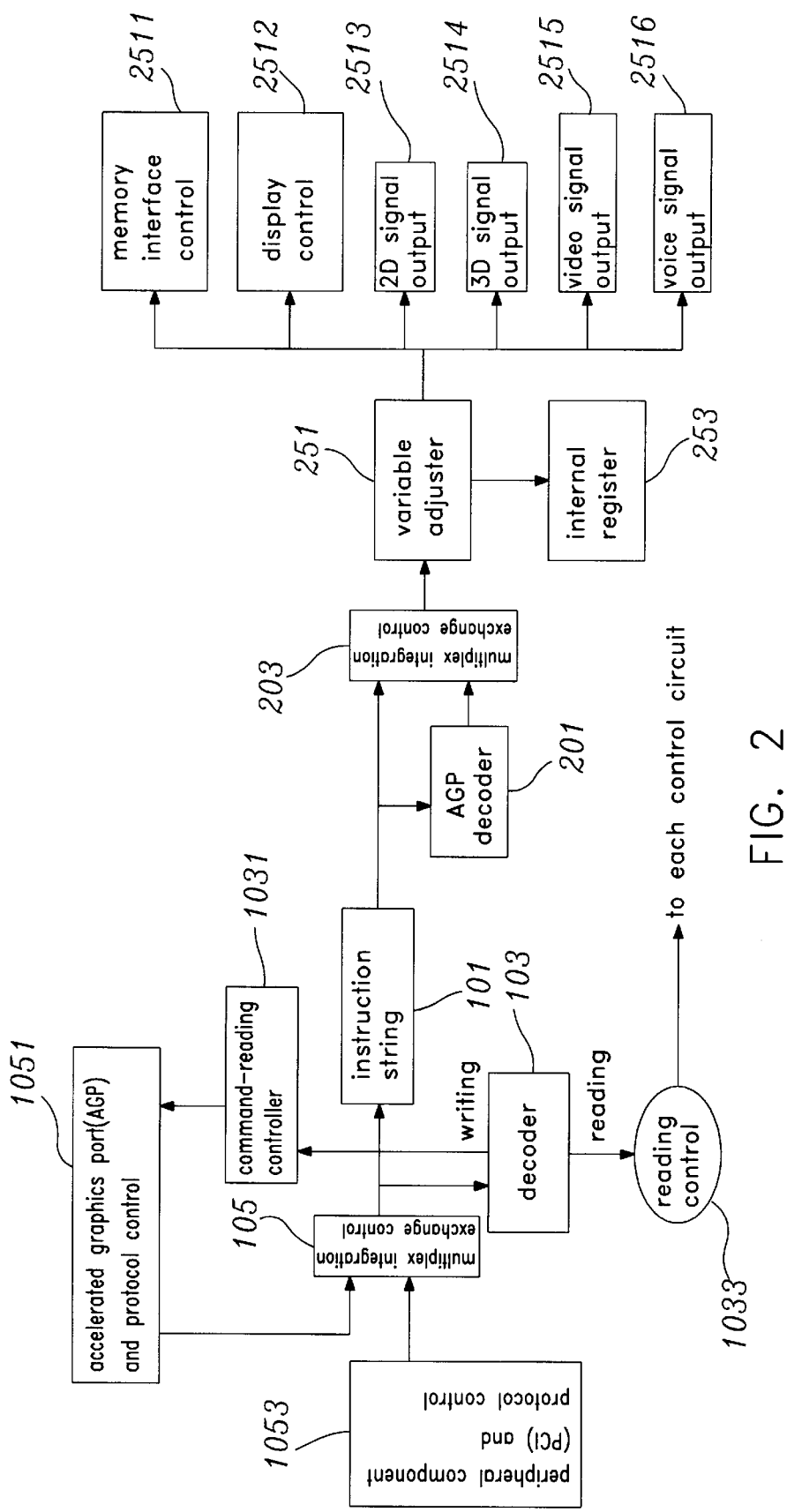

FIGS. 1 and 2 show block diagrams according to a preferred embodiment of the present invention. As shown in FIG. 1, the present invention comprises a memory 11, an instruction-string generating device 10, an instruction decoding unit 20, and an instruction executing unit 25. The memory 11 can be any dynamic random access memory (DRAM), static random access memory (SRAM), read-only memory (ROM), magnetic storing device, or optical storing device. The instruction-string generating device 10 can be a CPU of a computer, a hardware interface device, a firmware, or a software program, whose primary function is to generate or edit instruction data having a floating-point range-check field for operation. The instruction generat or edited by the instruction-string generating device 10 is transferred to the instruction decoding unit 20 via a transfer interface 15 to be decoded. That is, the instruction data is checked to see whether it has the floating-point range-check field. The result is then transferred to the instruction executing unit 25 for display. As shown in FIG. 2, the instruction decoding unit 20 comprises an instruction array 101, a decoder 103, an instruction-reading controller 1031, an accelerated graphics port (AGP) decoder 201, a variable adjuster 251, and an internal register 253. When the instruction-reading controller 1031 issues requests to read instructions, multimedia instructions are transferred to a multiplex integration exchange control 105 via an accelerated graphics port (AGP) and its protocol control 1051 or a peripheral component interconnect (PCI) and its protocol control 1053 for exchange and arrangement of instructions and data. The results are then output to the instruction array 101 and the decoder 103. When the input instruction is used as a reading-control command, the decoder 103 decodes the instruction and then transfers to the instruction-reading controller 1031. When the input instruction is used to read the content of each control circuit, the decoder 103 decodes the instruction data and transfers to a reading control 1033 and then to each control circuit. On the other hand, when the input instruction is used to write instructions to each multimedia executing unit, the instruction array 101 collects the instruction data for batch processing, and then transfers to the AGP decoder 201 to decode the processed instruction data (please refer to FIG. 3). The result is then arranged by the multiplex integration exchange control 203 and then transferred to the instruction executing unit 25 comprising the variable adjuster 251 and the internal register 253. Therefore, when the instruction data is transferred to the variable adjuster 251, the variable adjuster 251 will execute a program to edit the internal register 253 or execute each function output such as a memory interface output 2511, a display controller 2512, a 2D signal output 2513, a 3D signal output 2514, a video signal output 2515, and a voice signal output 2516. The internal register 253 is used to record and store the parameters and data used in the instruction executing unit 25.

Moreover, through the instruction-insertion function of the present invention, each multimedia function can be executed simultaneously. It is not necessary to wait for the completion of other units. Control instructions need not to be transferred repeatedly. The instruction array 101 can save storing space for other uses and secure the balance of system efficiency. These are the advantages of commands of single-instruction/multi-data format. Therefore, when each function output is executed, process time of repeatedly encoding control instructions can be saved to complete the execution of each instruction more efficiently.

On the other hand, among the multi-data pertaining to a single instruction, a voice-mode instruction can be added so that a voice-playing program can be executed during the process of 3D acceleration operation. The performance of the multimedia program can thus be enhanced.

The present invention uses part or all of the exponent field in the standard IEEE floating-point representation to determine whether the floating-point value is within the reasonable input range. If the floating-point value is not within the reasonable input range, it may be a control instruction of a certain mode; otherwise, it is properly processed according to different detection time, as shown in FIG. 3.

Figure 3:
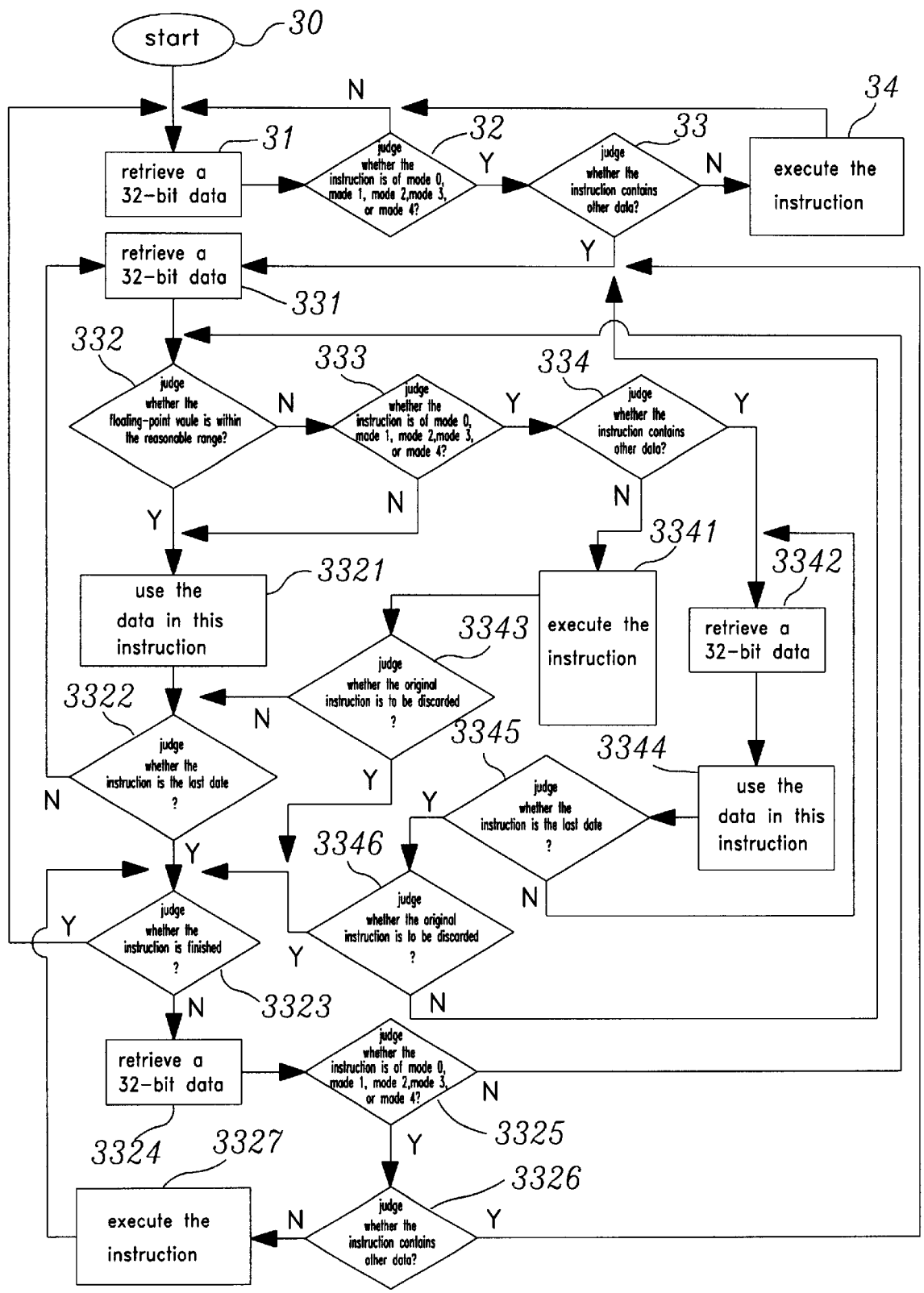
FIG. 3 is a decoding flowchart according to a preferred embodiment of the present invention.

FIG. 3 shows the operational flowchart of the AGP decoder 201 when only the first-order instruction-insertion function is provided according to a preferred embodiment of the present invention. In Step 30, decoding is started. In Step 31, a 32-bit data is retrieved. In Step 32, whether the data is an instruction of mode 0, mode 1, mode 2, mode 3, or mode 4 is judged; if the answer is negative, Step 31 is repeated until the data is an instruction of the edited mode. Next, in Step 33, whether the data contains other data is judged. If the data does not contain other data, the instruction is executed in Step 34 and Step 31 is repeated after completion of Step 34. If the data contains other data, a 32-bit data is further retrieved in Step 331 and whether the floating-point value of the data is within the reasonable input range is judged in Step 332. If the data is not within the reasonable input range, whether the data is an instruction of mode 0, mode 1, mode 2, mode 3, or mode 4 is judged in Step 333. If the answer is negative, the data is used in this instruction in Step 3321. In Step 3322, whether the instruction is the last data is judged; if the instruction is not the last data, Step 331 is again executed; if the instruction is the last data, whether instructions of the same type are finished is further judged in Step 3323. If instructions of the same type are finished, Step 31 is jumped back to execute the next instruction. If instructions of the same type are not finished, a 32-bit data is further retrieved in Step 3324. Storing space and execution time of a single instruction can be saved for instructions of the same type. Multi-data can be used directly to execute instructions of the same type. In Step 3325, whether the data is an instruction of mode 0, mode 1, mode 2, mode 3, or mode 4 is judged; if the answer is negative, Step 332 is repeated; otherwise, whether the data contains other data is judged in Step 3326. If the data does not contain other data, the instruction is executed in Step 3327 and Step 3323 is jumped back after completion of the instruction.

In Step 333, if the data is judged to be an instruction of mode 0, mode 1, mode 2, mode 3, or mode 4, whether the data contains other data is judged in Step 334. If the data does not contain other data, the instruction is executed in Step 3341. Next, whether the original instruction is to be discarded is judged in Step 3343. If the original instruction is to be discarded, execution of the inserted but not yet executed instruction is discarded in Step 3323. Or if the original instruction is not to be discarded, Step 3322 is jumped back. On the other hand, if the data is judged to contain other data in Step 334, a 32-bit data is further retrieved in Step 3342. The data is then used in this instruction in Step 3344. In Step 3345, whether the data is the last data is judged; if the answer is negative, Step 3342 is repeated; otherwise, whether the original instruction is to be discarded is judged in Step 3346. If the original instruction is not to be discarded, Step 331 is jumped back. Or if the original instruction is to be discarded, Step 3323 is jumped back.

Thereby, the decoding procedures of the first-order instruction-insertion can be completed. If the decoding procedures of the Nth-order instruction-insertion are needed, it is only necessary to repeatedly execute Steps 333 to 3346 till the required order of instruction data to be decoded is attained.

As shown in FIGS. 4A to 4E, Field 40 corresponding to Bit 29 and Bit 30 in the format of each mode control instruction is part of the floating-point range-check field and has a binary logic value of 11, representing that the floating-point value is outside the range of $-2^{65}$ to $2^{65}$. FIG. 4A shows an instruction of mode 0, wherein Bit 31 and Bit 28 are fixed to be binary logic values of 1 and 0, respectively. Bit 25 to Bit 27 are the instruction identification field, while Bit 0 to Bit 24 are reserved for instruction data. FIG. 4B shows an instruction of mode 1, wherein Bit 31 is fixed to be a binary logic value of 1. Field 41 corresponding to Bit 28 to Bit 25 has a binary logic value of 1000. This mode contains an I/O address stored in Bit 8 to Bit 0. Other bit fields are reserved for other uses. FIG. 4C shows an instruction of mode 2, wherein Bit 31 is fixed to be a binary logic value of 1. Field 42 corresponding to Bit 28 to Bit 25 has a binary logic value of 1001. This mode contains two I/O addresses, wherein the I/O address 1 is stored in Bit 20 to Bit 12 and the I/O address 2 is stored in Bit 8 to Bit 0. Other bit fields are reserved for other uses. FIG. 4D shows an instruction of mode 3, wherein Bit 31 is fixed to be a binary logic value of 1. Field 43 corresponding to Bit 28 to Bit 25 has a binary logic value of 1010. This mode contains an I/O address stored in Bit 8 to Bit 0 and a counter-value storing field situated from Bit 24 to Bit 12. Other bit fields are reserved for other uses. FIG. 4E shows an instruction of mode 4, wherein Bit 31 is fixed to be a binary logic value of 1. Field 44 corresponding to Bit 28 to Bit 25 has a binary logic value of 1011. This mode contains a counter-value storing field situated from Bit 24 to Bit 9 and an identification field stored from Bit 8 to Bit 0.

Summing up, the present invention proposes a multimedia-instruction acceleration device for increasing efficiency and a method for the same, which uses instruction strings having a floating-point value check field to execute commands of single-instruction/multi-data format, and further transforms the floating-point value to a fixed one. The present invention can effectively save executing time and simplify numerical calculation process, and can fully exploit memory space to achieve the object of increasing acceleration operation and execution of multimedia instructions.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A multimedia-instruction acceleration device for increasing efficiency comprising:

a memory;

an instruction-string generating device connected to said memory, said instruction-string generating device being used to access data and instructions in said memory and to encode said instructions;

an instruction transfer interface connected to said instruction-string generating device and used to provide connection of each instruction transfer;

an instruction decoding unit connected to an output of said instruction transfer interface and used to decode said encoded instructions, said instruction decoding unit including a decoder for providing a decoded instruction output of reading-control commands, an instruction array for collecting instruction data responsive to writing-control commands, and an AGP decoder coupled to an output of said instruction array for decoding instruction data therefrom; and an instruction executing unit connected to an output of said instruction decoding unit and used to execute the instruction output from said instruction decoding unit.

2. The multimedia-instruction acceleration device of claim 1, wherein the format of the instruction string generated and encoded by said instruction-string generating device is 32-bit or 64-bit long, and part or all of a floating-point range-check field is contained therein.

3. The multimedia-instruction acceleration device of claim 2, wherein the format of said instruction string further contains a control instruction mode field.

4. The multimedia-instruction acceleration device of claim 2, wherein said instruction decoding unit can be used to judge whether an input instruction string contains said floating-point range-check field.

5. The multimedia-instruction acceleration device of claim 1, wherein said instruction executing unit can be any function output such as a memory interface, a display controller, a 2D signal output, a 3D signal output, a video signal output, or a voice signal output.

6. A multimedia-instruction acceleration device for increasing efficiency comprising:

a memory;

an instruction-string generating device connected to said memory, said instruction-string generating device being used to access data and instructions in said memory and to encode said instructions, a format of an instruction string generated and encoded by said instruction-string generating device is one of 32-bits or 64-bits long, at least a portion of a floating-point range-check field being contained therein, where the format of the instruction string is 32-bits long, Bit 23 to Bit 30 thereof corresponds to said floating-point range-check field, where the format is 64 bits long, Bit 52 to Bit 62 thereof corresponds to said floating-point range-check field;

an instruction transfer interface connected to said instruction-string generating device and used to provide connection of each instruction transfer;

an instruction decoding unit connected to an output of said instruction transfer interface and used to decode said encoded instructions; and an instruction executing unit connected to an output of said instruction decoding unit and used to execute the instruction output from said instruction decoding unit.

7. A multimedia-instruction acceleration device for increasing efficiency comprising:

a memory;

an instruction-string generating device connected to said memory, said instruction-string generating device being used to acces data and instructions in said memory and to encode said instructions, a format of an instruction string generated and encoded by said instruction-string generating device is one of 32-bits or 64-bits long and contains a control instruction mode field, at least a portion of a floating-point range-check field being contained therein, said control instruction mode field in the format of said instruction string corresponds to Bit 31 and Bit 28 to Bit 25 thereof;

an instruction transfer interface connected to said instruction-string generating device and used to provide connection of each instruction transfer;

an instruction decoding unit connected to an output of said instruction transfer interface and used to decode said encoded instructions; and an instruction executing unit connected to an output of said instruction decoding unit and used to execute the instruction output from said instruction decoding unit.

8. The multimedia-instruction acceleration device of claim 7, wherein if Bit 31 and Bit 28 to Bit 25 of said instruction of 32-bit format correspond to a binary logic value of 11000, said instruction is a mode-1 instruction.

9. The multimedia-instruction acceleration device of claim 7, wherein if Bit 31 and Bit 28 to Bit 25 of said instruction of 32-bit format correspond to a binary logic value of 11001, said instruction is a mode-2 instruction.

10. The multimedia-instruction acceleration device of claim 7, wherein if Bit 31 and Bit 28 to Bit 25 of said instruction of 32-bit format correspond to a binary logic value of 11010, said instruction is a mode-3 instruction.

11. The multimedia-instruction acceleration device of claim 7, wherein if Bit 31 and Bit 28 to Bit 25 of said instruction of 32-bit format correspond to a binary logic value of 11011, said instruction is a mode-4 instruction.

12. A decoding method for said instruction decoding unit of the multimedia-instruction acceleration device including a memory, an instruction-string generating device connected to said memory to access data and instructions in said memory and to encode said instructions, an instruction transfer interface connected to said instruction-string generating device and used to provide connection of each instruction transfer, an instruction decoding unit connected to an output of said instruction transfer interface and used to decode said encoded instructions, and an instruction executing unit connected to an output of said instruction decoding unit and used to execute the instruction output from said instruction decoding unit, comprising at least the steps of:

(a). retrieving a 32-bit data;

(b). judging whether said data contains a floating-point range-check field; if no, repeating said Step (a) until said data contains said floating-point range-check field;

(c). judging whether said instruction contains other data; if no, executing said instruction and then repeating said Step (a);

(d). retrieving another 32-bit data if said instruction contains other data, and then judging whether the floating-point value of said instruction is within the reasonable range;

(e). judging whether said instruction contains said floating-point range-check field if the floating-point value of said instruction is not within the reasonable range;

(f). using said data in said instruction if said instruction contains said floating-point range-check field and the judgement in said Step (d) is negative;

(g). judging whether said data is the last data, jumping to said step (d) if said data is not the last data;

(h). judging whether said data is finished if said data is the last data, jumping to said Step (a) to execute the next instruction if said data is finished;

(i). retrieving another 32-bit data if said instruction is judged not to be the last data in said Step (h), and judging whether said instruction contains said floating-point range-check field;

(j). jumping to said Step (d) if said instruction does not contain said floating-point range-check field;

(k). judging whether said instruction contains other data if said instruction contains said floating-point range-check field, jumping to said Step (h) if said instruction does not contain other data; and (l). jumping to said Step (d) if said instruction contains other data.

13. The decoding method of claim 12 further comprising the steps of:

(m). furtherjudging whether said instruction contains other data if said instruction is judged to contain said floating-point range-check field in said Step (e);

(n). executing said instruction if said instruction does not contain other data, and then judging whether the original instruction is to be discarded;

(o). jumping to said Step (h) if the original instruction is to be discarded; and (p). jumping to said Step (g) if the original instruction is not to be discarded.

14. The decoding method of claim 13 comprising the steps of:

(q). retrieving another 32-bit data and using said data in said instruction if said instruction is judged not to contain other data in said Step (m);

(r). judging whether said instruction is the last data, repeating said Step (q) if said instruction is not the last data;

(s). further judging whether the original instruction is to be discarded if said instruction is judged to be the last data in said Step (r), jumping to said Step (d) if the original instruction is not to be discarded; and (t). jumping to said Step (h) if the original instruction is to be discarded.

15. The decoding method of claim 12, wherein said Step (b) can be replaced with the step of:

judging whether said data is an instruction of mode 0, mode 1, mode 2, mode 3, or mode 4; if no, repeating said Step (a) until said data is an instruction of the edited mode.

16. The decoding method of claim 12, wherein said Step (e) can be replaced with the step of:

judging whether said data is an instruction of mode 0, mode 1, mode 2, mode 3, or mode 4 if the floating-point value of said instruction is not within the reasonable range; if no, jumping to said Step (f).

17. The decoding method of claim 12, wherein said Step (i) can be replaced with the step of:

retrieving another 32-bit data and judging whether said instruction is an instruction of mode 0, mode 1, mode 2, mode 3, or mode 4 if said instruction is judged not to be the last data in said Step (h); if no, jumping to said Step (d).

18. A multimedia-instruction acceleration method for increasing efficiency characterized in that the format of data instruction uses instruction strings having a floating-point range-check field to execute commands of single-instruction/multi-data format, a mode instruction is insertable among multi-data pertaining to said single instruction so that other programs can be executed during the processing of an acceleration calculation program, said inserted mode instruction being a null instruction, said null instruction being one of an instruction writing data to a null address or an instruction of mode 3 or mode 4 whose counter value is set to be zero.

19. The multimedia-instruction acceleration method of claim 18, wherein a voice mode instruction can be inserted among the multi-data pertaining to said single instruction so that voice-playing programs can be executed during the processing of an acceleration calculation program.

20. The multimedia-instruction acceleration method of claim 18, wherein said floating-point value can be further transformed to a fixed value.

* * * * *